United States Patent
Nowakowski et al.

(10) Patent No.: US 9,253,135 B2
(45) Date of Patent: Feb. 2, 2016

(54) NOTIFICATION MANAGEMENT

(75) Inventors: Maciej Szymon Nowakowski, Zurich (CH); Peter Werner Balsiger, Bern (CH)

(73) Assignee: Google Inc., Mountain View, CA (US)

( * ) Notice: Subject to any disclaimer, the term of this patent is extended or adjusted under 35 U.S.C. 154(b) by 87 days.

(21) Appl. No.: 13/368,313

(22) Filed: Feb. 7, 2012

(65) Prior Publication Data

US 2015/0215258 A1 Jul. 30, 2015

(51) Int. Cl.
*H04L 12/58* (2006.01)
*H04L 29/08* (2006.01)
*G06F 9/54* (2006.01)

(52) U.S. Cl.
CPC ............. *H04L 51/24* (2013.01); *G06F 9/542* (2013.01); *H04L 51/32* (2013.01); *H04L 67/02* (2013.01)

(58) Field of Classification Search
CPC ......... H04L 51/24; H04L 51/32; H04L 67/02; G06F 9/542
See application file for complete search history.

(56) References Cited

U.S. PATENT DOCUMENTS

| | | | |
|---|---|---|---|
| 7,478,132 B2 | 1/2009 | Chen et al. | |
| 7,568,010 B2 | 7/2009 | Lyle et al. | |
| 7,710,832 B2 * | 5/2010 | Forstall et al. | 368/29 |
| 7,921,176 B2 | 4/2011 | Madnani | |
| 8,407,075 B2 * | 3/2013 | Lance et al. | 705/7.18 |
| 2004/0061716 A1 * | 4/2004 | Cheung et al. | 345/710 |
| 2006/0190485 A1 * | 8/2006 | Adams et al. | 707/104.1 |
| 2006/0274701 A1 * | 12/2006 | Albertsson | 370/338 |
| 2007/0265903 A1 * | 11/2007 | Blair et al. | 705/9 |
| 2008/0162510 A1 * | 7/2008 | Baio et al. | 707/100 |
| 2009/0054091 A1 * | 2/2009 | van Wijk et al. | 455/466 |
| 2011/0280386 A1 * | 11/2011 | Fotta et al. | 379/196 |
| 2012/0149342 A1 * | 6/2012 | Cohen | H04L 12/587 455/412.2 |
| 2012/0204191 A1 * | 8/2012 | Shia et al. | 719/318 |
| 2013/0078958 A1 * | 3/2013 | Kyprianou | 455/412.2 |

OTHER PUBLICATIONS

Rogers, "Outlook 2007: Disable Deleting of Meeting Request from Inbox When Responding", Tech-Recipes: Your Cookbook of Tech-Tutorials, retrieved from <http://www.tech-recipes.com/rx/2312/outlook_2007_disable_deleting_meeting_request/>, Apr. 27, 2007.

* cited by examiner

*Primary Examiner* — Charles E Anya
(74) *Attorney, Agent, or Firm* — McDermott Will & Emery LLP (57) ABSTRACT

Computer-implemented methods for providing a single notification for display in an application from multiple received notifications are provided. In one aspect, a method includes receiving a first notification for an application and receiving a second notification for the application subsequent to the first notification, and analyzing content of the first notification and content of the second notification. The method also includes determining, based on the analysis, whether the second notification is related to the first notification, and providing, for display, a single notification includes at least a portion of the content of the first notification and at least a portion of the content of the second notification when the second notification is related to the first notification. Systems and machine-readable media are also provided.

20 Claims, 5 Drawing Sheets

NOTIFICATION MANAGEMENT

BACKGROUND

The present disclosure generally relates to processing data transmitted over a network, and more particularly to the use of a computing device to process notification data.

When a person purchases an item or service online, or is scheduled to attend an event, the person often receives multiple electronic notifications for the item, service, or event. For instance, a person who is invited to a meeting might first receive a notification email requesting attendance at the meeting, followed by a second notification email confirming acceptance of the meeting request, a third notification email when another user proposes a new time for the meeting, a fourth notification email when another user changes the location of the meeting, and a fifth notification email when the meeting organizer has canceled the meeting. This results in five notification emails for the same meeting in the person's email inbox, which can be burdensome for the person to read and can congest the person's inbox.

SUMMARY

According to one embodiment of the present disclosure, a computer-implemented method for providing a single notification for display in an application from multiple received notifications is provided. The method includes receiving a first notification for an application and receiving a second notification for the application subsequent to the first notification, and analyzing content of the first notification and content of the second notification. The method also includes determining, based on the analysis, whether the second notification is related to the first notification, and providing, for display, a single notification includes at least a portion of the content of the first notification and at least a portion of the content of the second notification when the second notification is related to the first notification.

According to another embodiment of the present disclosure, a system for providing a single notification for display in an application from multiple received notifications is provided. The system includes a memory that includes a first notification for an application and a second notification for the application received subsequent to the first notification, and a processor. The processor is configured to analyze content of the first notification and content of the second notification, and determine, based on the analysis, whether the second notification is related to the first notification. The processor is also configured to provide, for display, a single notification includes at least a portion of the content of the first notification and at least a portion of the content of the second notification when the second notification is related to the first notification.

According to one embodiment of the present disclosure, a machine-readable storage medium includes machine-readable instructions for causing a processor to execute a method for providing a single notification for display in an application from multiple received notifications, the method includes is provided. The method includes receiving a first electronic message notification for an application and receiving a second electronic message notification for the application subsequent to the first electronic message notification, and identifying an item, event, or service associated with content of the first electronic message notification and an item, event, or service associated with content of the second electronic message notification. The method also includes determining, based on the identifications, whether the second electronic message notification is for the same item, event, or service as the first electronic message notification, and providing, for display, a single notification includes at least a portion of the content of the first electronic message notification and at least a portion of the content of the second electronic message notification when the second electronic message notification is related to the first electronic message notification.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed system analyzes the content of received notifications related to an item, event, or service, and then displays a single notification with appropriate, updated content from the notifications for that item, event, or service. The disclosed system is advantageous because it is configured to work with existing notification systems, such as existing electronic mail and text messaging formats.

As one example of the disclosed system, when a person is invited to a meeting by receiving a first notification requesting attendance at the meeting, the first notification for the request to attend the meeting is displayed. When a second notification confirming acceptance of the meeting request is received, the first notification is replaced with a single, status notification combining the relevant portions of the first and second notifications. The status notification displays that the person has accepted the meeting request, along with any relevant information from the first notification. When a third notification is received indicating that another user proposed a new time for the meeting, the status notification is updated with the relevant information from the third notification regarding the proposed new time for the meeting. When a fourth notification is received indicating another user proposes to change the location of the meeting, the status notification is updated with the relevant information from the fourth notification regarding the changed location for the meeting. Finally, when a fifth notification is received indicating the meeting organizer has canceled the meeting, the status notification indicates the meeting has been canceled, or the status notification is removed completely due to the cancellation of the meeting. During this entire process, only one status notification for the meeting is displayed by a message notifier or within a notification region (e.g., an inbox) instead of multiple notifications. Additionally, instead of displaying a combination notification, the latest notification for the item, event, or service can be displayed, along with a link to the older notifications, if appropriate.

Although many examples provided herein describe a user's information being stored in memory (e.g., a user's notifications) or being analyzed, the user can, at any time, delete the user information from memory and/or opt out of having the user information stored in memory and/or analyzed. Additionally, the user can, at any time, adjust appropriate privacy settings to selectively limit the types of user information stored in memory or analyzed, or select the memory in which the user information is stored (e.g., locally on the user's device as opposed to remotely a server) or the type of information that is analyzed. In many examples, the user information does not include and/or share the specific identification of the user (e.g., the user's name) unless otherwise specifically provided or directed by the user.

Figure 1:
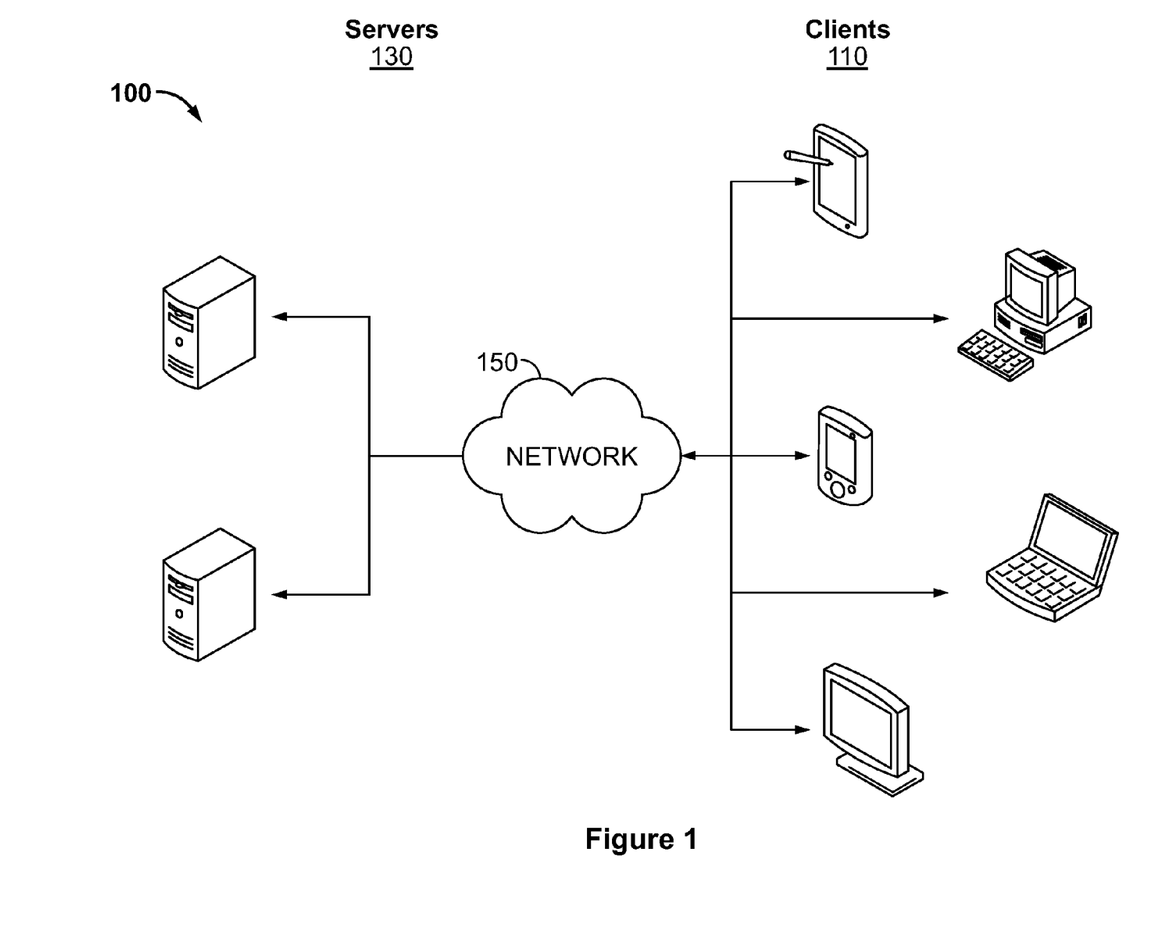
FIG. 1 illustrates an exemplary architecture for providing a single notification for display from multiple received notifications.

FIG. 1 illustrates an exemplary architecture 100 for providing a single notification for display from multiple received notifications. The architecture 100 includes servers 130 and clients 110 connected over a network 150.

One of the many servers 130 is configured to host a notification source that generates notifications. A notification can be, for example, electronic mail ("email"), a text message, a social network message, a meeting request, or a type of electronic message. When a notification is an electronic message, the message body of the email can be in a plain text or a HyperText Markup Language (HTML) format. The notifications can be for an item (e.g., purchased product), event (e.g., calendar event), or service (e.g., vehicle repair), and can indicate, without limitation, a calendar event (e.g., an invitation to a meeting), purchasing event (e.g., an order has been placed), approval event (e.g., "+1" or another indication approving a statement), or social networking event (e.g., a user has received a comment on a posted item from a connected user). For purposes of load balancing, multiple servers 130 can host the notification source.

As discussed herein, the notification source on a server 130 is configured to generate and transmit notifications over a network 150 to a user via a notification provider (e.g., electronic messaging service) associated with the user on another server 130. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The servers 130 can be any device having an appropriate processor, memory, and communications capability for hosting the notification source and notification provider. The notification provider on the server 130 can provide the notification to a notification interface on the user's client 110. The clients 110 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities.

The disclosed system (e.g., the notification provider or the notification interface, depending on the selected configuration) receives an initial notification and any number of subsequent notifications, and determines whether the content of the initial notification and subsequent notifications are related to the same subject matter (e.g., item, event, or service). If the content is related, the system provides a single notification for display. The single notification can be a generated notification that includes relevant information from each of the received notifications, or the single notification can be the last received notification. If the content is not related, the system provides each notification for display separately. If a user requests to view any of the received notifications (e.g., using input device 116) separately from the single notification, the system provides the requested notification to the user. The disclosed system is capable of running on a server 130 as a notification provider (e.g., as part of an electronic messaging service) or on a client 110 as a notification interface (e.g., as part of an electronic messaging client).

Figure 2:
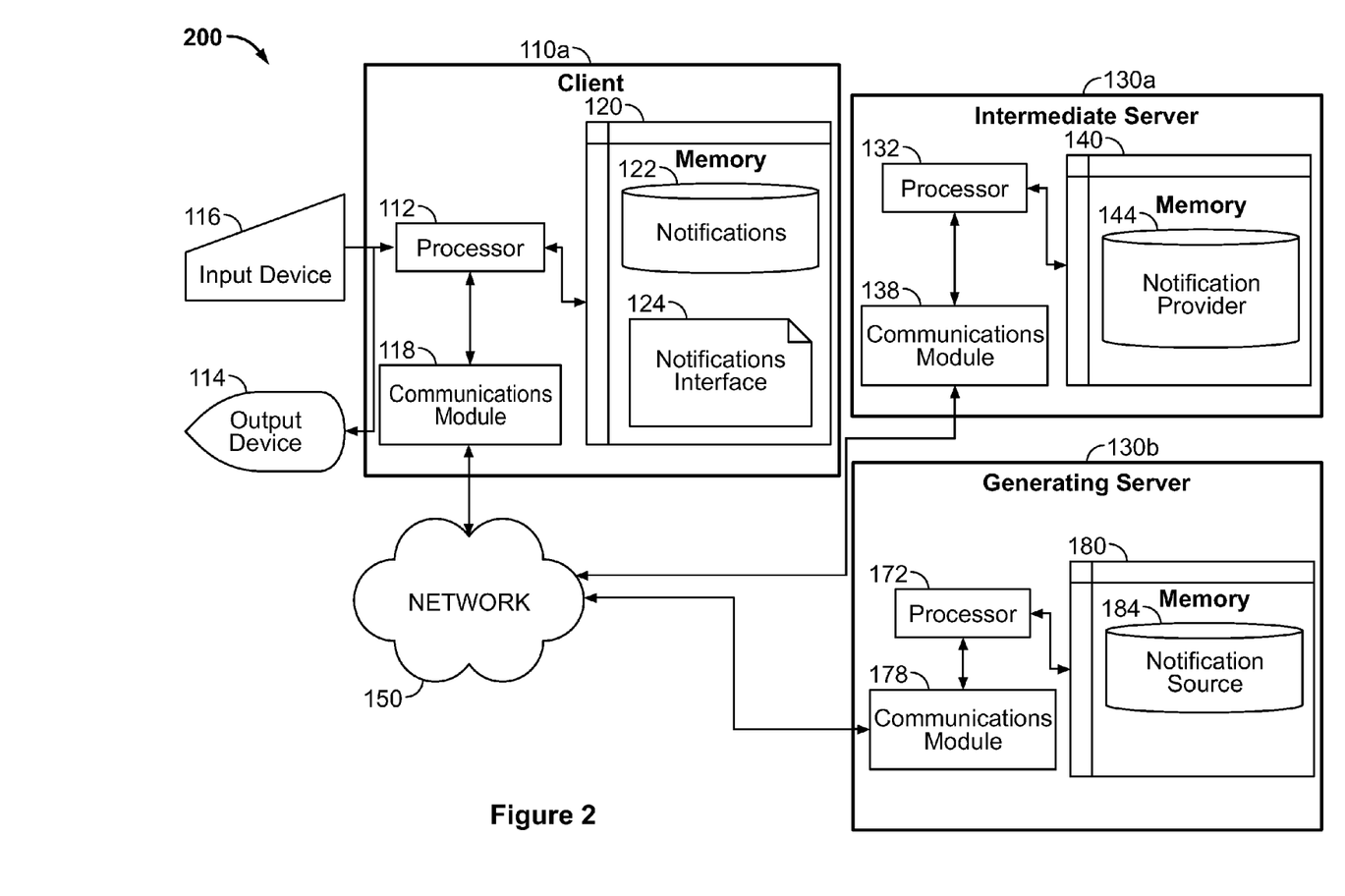
FIG. 2 is a block diagram illustrating an exemplary client and servers from the architecture of FIG. 1 according to certain aspects of the disclosure.

FIG. 2 is a block diagram 200 illustrating an exemplary client 110 and exemplary servers 130a and 130b in the architecture 100 of FIG. 1 according to certain aspects of the disclosure. The client 110, the intermediate server 130a, and the generating server 130b are connected over the network 150 via respective communications modules 118, 138, and 178. Although both the intermediate server 130a and the generating server 130b are illustrated as a single server, each of the intermediate server 130a and the generating server 130b can be multiple servers that share resources and functionality. The communications modules 118, 138, and 178 may be configured by respective processors 112, 132, and 172 to interface with the network 150 to send and receive information, such as data, requests, responses, and commands to other devices on the network. The communications modules 118, 138, and 178 can be, for example, modems or Ethernet cards.

The client 110 includes a processor 112, the communications module 118, and a memory 120 that includes a notification interface (or "application") 124 and notifications 122. The notifications 122 are initially generated by a notification source 184 (e.g., that generates notifications for an item, event, or service) in the memory 180 of the generating server 130b. The notifications 122 are stored in memory 120 on the client 110 after being provided to the notification interface 124 of the client 110 over the network 150 via a notification provider 144 (e.g., an electronic messaging service) in the memory 140 of the intermediate server 130a. The notification interface 124 can be, for example, a web page in a web browser (e.g., a front-end user interface for an electronic messaging service) or a notification (e.g., electronic message or text message) client application. The client 110 also includes an input device 116, such as a keyboard or mouse, and an output device 114, such as a display.

The processor 112 of the client 110 is configured to execute instructions, such as instructions physically coded into the processor 112, instructions received from software in memory 120 (e.g., JavaScript associated with the notification interface 124), or a combination of both. For example, in certain aspects where the notification interface 124 of the client 110 is responsible for generating single notifications, the processor 112 of the client 110 executes instructions from the notification interface 124 to receive an initial, first notification and receive a second notification subsequent to the first notification, analyze content of the initial notification and content of the subsequent notification, and determine, based on the analysis, whether the subsequent notification is related to the initial notification. Analyzing the content of the initial notification and the content of the subsequent notification can include identifying an item, event, or service associated with the initial notification and an item, event, or service associated with the subsequent notification, and determining whether the subsequent notification is related to the initial notification can include determining whether the subsequent notification is for the same item, event, or service as the initial notification. Analyzing the content of the initial notification and the content of the subsequent notification can also include identifying a recipient, sender, subject, or message of the initial notification and a recipient, sender, subject, or message of the subsequent notification. In addition, determining whether the subsequent notification is related to the initial notification can include determining whether the subsequent notification is for the same a recipient, sender, subject, and/or message.

When the subsequent notification is determined to be related to the initial notification, the processor 112 is further configured to provide, for display (e.g., on output device 114), a single notification. The single notification includes at least a portion of the content of the initial notification (e.g., information from the initial notification) and at least a portion of the content of the subsequent notification (e.g., information from the subsequent notification). For example, if the initial notification is an invitation to a calendar event, the portion that is included in the single notification can be a link to the initial notification, and if the subsequent notification indicates a change in location of the event, the portion from the subsequent notification that is included in the single notification can be information on the change of location. The portion of content from the initial or subsequent notification that is included in the single notification can be information from the initial or subsequent notification, or can be information derived from the initial or subsequent notification.

In certain aspects, the single notification is generated based on the initial notification and the subsequent notification, such as where the single notification can be a new notification combining content from the initial notification and content from the subsequent notification. For example, if the initial notification is a confirmation that an item order has been placed, the portion that is included in the single notification can be the order number, and if the subsequent notification indicates the item has been shipped, the portion from the subsequent notification that is included in the single notification can be the shipping tracking number.

In certain aspects, the single notification is provided by displaying the subsequent notification, and removing the initial notification from display. In such cases where a subsequent notification is provided for display as the single notification in place of the initial notification, the initial notification (or any other received notification) can be provided for display (e.g., from the notifications 122 in memory 120) in response to a request from a user.

If the subsequent notification includes an indication to delete any previously received related notifications (e.g., the initial notification), such as if the subsequent notification is an event cancellation notification, then the processor 112 can be configured to remove the initial notification and the subsequent notification. Additionally, the single notification can be configured in a format specific to the issuing source of the initial notification and the subsequent notification. For example, if the initial notification and subsequent notification are issued by ABCsales.com, the single notification can be configured based on an application programming interface, template, or other information from ABCsales.com. For instance, the single notification can be configured to identify what type of information to include from the content of the initial notification and subsequent notification, and then include the information according to a certain format specific to ABCsales.com.

The processor 112 of the client 110 is configured to similarly analyze the content of additional received subsequent notifications and determine whether the additional subsequent notifications are related to the initial notification. Similar to the configuration of the processor 112 described above, when the additional subsequent notifications are related to the initial notification, the processor 112 is configured to provide, for display, an updated single notification. The updated single notification includes at least a portion of the content of the initial notification, at least a portion of the content of the additional subsequent notifications, and, if relevant, at least a portion of the content of the first subsequent notification.

Turning to the intermediate server 130a, the intermediate server 130a includes a processor 132, the communications module 138, and the memory 140 that includes the notification provider 144. The processor 132 of the intermediate server 130a is configured to execute instructions, such as instructions physically coded into the processor 132, instructions received from software in memory 140 (e.g., the notification provider 144), or a combination of both. For example, in certain aspects where the notification provider 144 of the intermediate server 130a is responsible for generating single notifications (and not the notification interface 124 of the client 110), the processor 132 of the intermediate server 130a executes instructions from the notification provider 144 to provide the single notification similar to the instructions described above from the notification interface 124 of the client 110. The intermediate server 130a provides the single notification to the notification interface 124 (e.g., which in this aspect can be a standard notification client) on the client 110 for display (e.g., on output device 114). In such aspects, the notifications 122 can be stored in the memory 140 of the intermediate server 130a.

Figure 3:
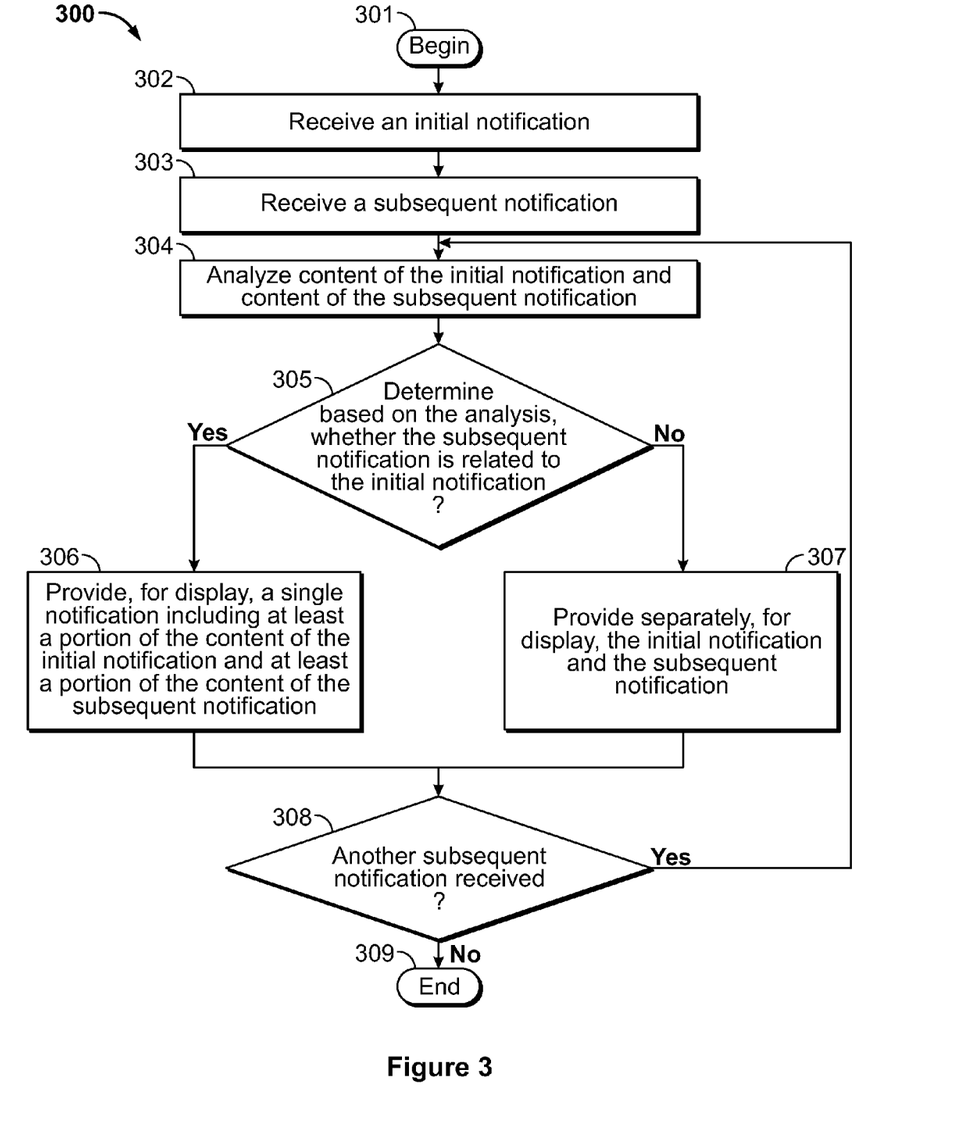
FIG. 3 illustrates an exemplary process for providing a single notification for display from multiple received notifications using an exemplary client of FIG. 2.

FIG. 3 illustrates an exemplary process 300 for providing a single notification for display from multiple received notifications using either the exemplary client 110 of FIG. 2. Although the exemplary process 300 as described herein is in reference to the notification interface 124 of the exemplary client 110 providing the single notification, in certain aspects the exemplary process 300 can be executed by the notification provider 144 of the intermediate server 130a in order for the notification provider 144 to provide the single notification for display. The process 300 begins by proceeding from beginning step 301 to step 302 when an initial notification is received (e.g., by the notification interface 124 via the notification provider 144 from the notification source 184), and step 303 when a subsequent notification is received. In step 304, content of the initial notification and content of the subsequent notification is analyzed. In step 305 it is determined, based on the analysis, whether the subsequent notification is related to the initial notification. If the subsequent notification is related to the initial notification, the process 300 proceeds to step 306 where a single notification including at least a portion of the content of the initial notification and at least a portion of the content of the subsequent notification is provided for display (e.g., on output device 114). Otherwise, if the subsequent notification is not related to the initial notification, the process 300 proceeds to step 307 where the initial notification and the subsequent notification are provided separately for display. Next, in step 308, if another subsequent notification is received, the process 300 returns to step 304, otherwise the process 300 ends in step 309.

Figure 4A:
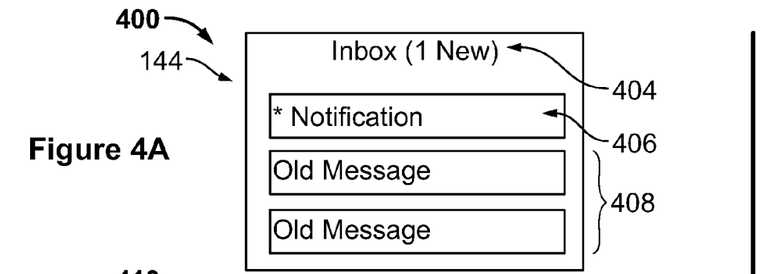
FIGS. 4A-4E are exemplary illustrations associated with the exemplary process of FIG. 3.

An example will now be described using the exemplary process 300 of FIG. 3, a client 110 that is a mobile device, and notifications for a calendar event that are received as electronic messages in a notification provider 144 that is an electronic message client on the mobile device. The process 300 begins by proceeding from beginning step 301 to step 302 when an initial electronic message notification is received on a user's mobile device 110 inviting the user to a calendar event. FIGS. 4A-4E are exemplary illustrations 400, 410, 420, 430, and 440 of the notification provider 144 displayed on the mobile device over a course of time 401. FIG. 4A illustrates when the initial electronic message notification invitation 406 (or "status notification") to the calendar event is received. The notification provider 144 accordingly indicates that there is one new electronic message 404 in addition to the older electronic messages 408.

Figure 4B:
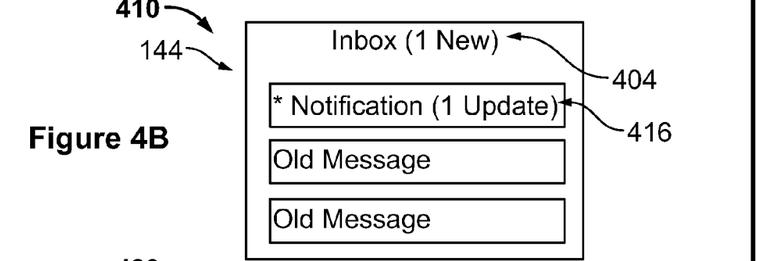

In step 303, a second electronic message notification is received indicating that an attendee has accepted their invitation to the calendar event. In step 304, content of the initial electronic message notification for the calendar event invitation and content of the second notification for the calendar event acceptance by another attendee are analyzed, and in step 305 it is determined, based on the analysis, that the second electronic message notification is for the same event as the initial notification. The process 300 proceeds to step 306 where a single notification 416 is provided for display, as provided in the illustration 410 of FIG. 4B. Specifically, FIG. 4B illustrates that there is still one new electronic message 404 even though there are two new notifications (e.g., the initial electronic message notification for the event and the second electronic message notification for the event), and has combined them as a single notification 416 that indicates one update (e.g., the second notification) has been received for the single notification 416. The single notification includes information on the event invitation for the user as well as information on the acceptance by the other attendee.

Figure 4C:
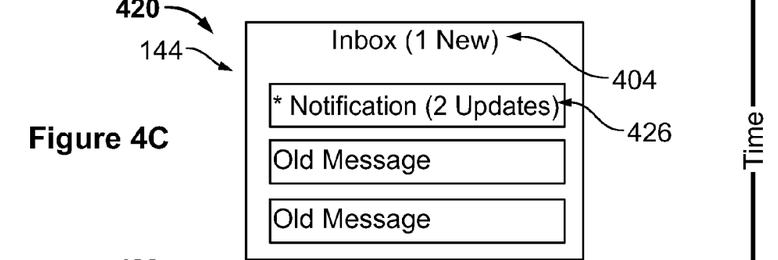

Next, in step 308, a third notification indicating a location change for the event is received, and the process 300 returns to step 304. In step 304, content of the initial electronic message notification for the calendar event invitation and content of the third notification for the calendar event indicating the location change are analyzed, and in step 305 it is determined, based on the analysis, that the third electronic message notification is for the same event as the initial notification. The process 300 proceeds to step 306 where a single notification 426 is provided for display, as provided in the illustration 420 of FIG. 4C. Specifically, FIG. 4C illustrates that there is still one new electronic message 404 even though there are three new notifications (e.g., the initial, second, and third electronic message notifications for the event), and has combined them as a single notification 426 that indicates two updates (e.g., the second and third notifications) have been received for the single notification 426. The single notification 426 includes information on the event invitation for the user, information on the acceptance by the other attendee, and information on the location change.

Figure 4D:
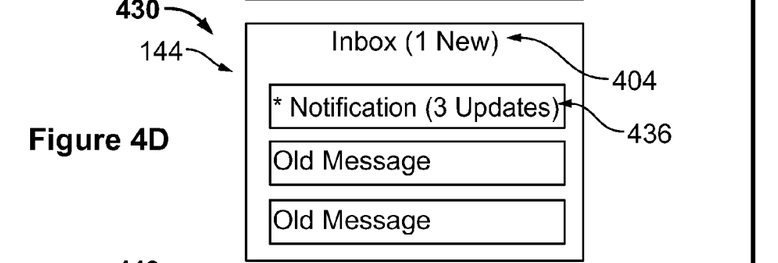
Figure 4E:
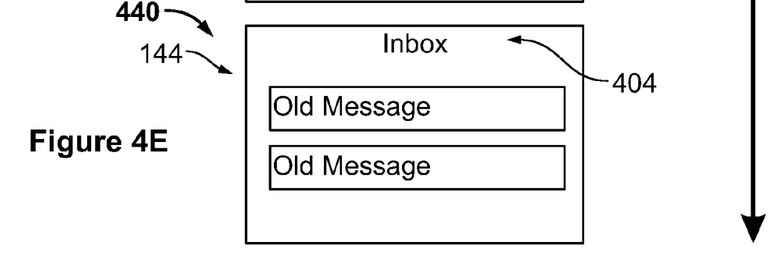

Next, in step 308, a fourth notification indicating a time change for the event is received, and the process 300 returns to step 304. In step 304, content of the initial electronic message notification for the calendar event invitation and content of the fourth notification for the calendar event indicating the time change are analyzed, and in step 305 it is determined, based on the analysis, that the fourth electronic message notification is for the same event as the initial notification. The process 300 proceeds to step 306 where a single notification 436 is provided for display, as provided in the illustration 430 of FIG. 4D. Specifically, FIG. 4D illustrates that there is still one new electronic message 404 even though there are four new notifications (e.g., the initial, second, third, and fourth electronic message notifications for the event), and has combined them as a single notification 436 that indicates three updates (e.g., the second, third, and fourth notifications) have been received for the single notification 436. The single notification 436 includes information on the event invitation for the user, information on the acceptance by the other attendee, information on the time change, and information on the location change.

Next, in step 308, a fifth notification indicating a cancellation of the event is received, and the process 300 returns to step 304. In step 304, content of the initial electronic message notification for the calendar event invitation and content of the fifth notification for the calendar event cancellation are analyzed, and in step 305 it is determined, based on the analysis, that the fifth electronic message notification is for the same event as the initial notification. The process 300 proceeds to step 306 where the single notification 436 is removed from display, as provided in the illustration 440 of FIG. 4E. Specifically, FIG. 4E no new electronic messages 404 and the removal of the single notification 436 of FIG. 4D.

Finally, in step 308, no additional notifications are received and the process 300 then ends in step 309.

Figure 5:
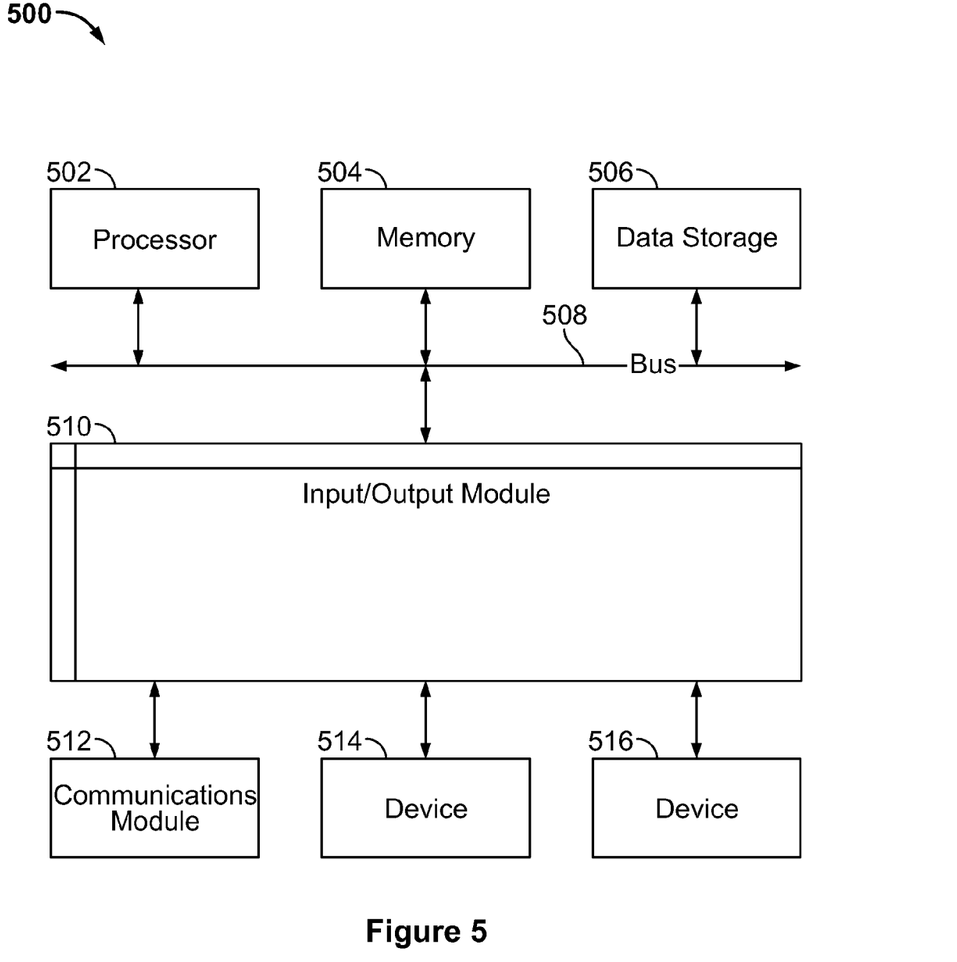
FIG. 5 is a block diagram illustrating an exemplary computer system with which the client and servers of FIG. 2 can be implemented.

FIG. 5 is a block diagram illustrating an exemplary computer system 500 with which the client 110 and servers 130a and 130b of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110 and servers 130a and 130b) includes a bus 508 or other communication mechanism for communicating information, and a processor 502 (e.g., processor 112, 132, and 172) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 120, 140, and 180), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 (e.g., communications modules 118, 138, and 178) include networking interface cards, such as Ethernet cards and modems. In certain aspects, the input/output module 510 is configured to connect to a plurality of devices, such as an input device 514 (e.g., input device 116) and/or an output device 516 (e.g., output device 114). Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 516 include display devices, such as a LED (light emitting diode), CRT (cathode ray tube), or LCD (liquid crystal display) screen, for displaying information to the user.

According to one aspect of the present disclosure, the client 110 and servers 130a and 130b can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 502 for execution. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method for providing a single notification for display in an application from multiple received notifications, the method comprising:
   receiving a first notification for an application;
   receiving a second notification for the application subsequent to the first notification;
   analyzing content of the first notification and content of the second notification;
   determining, based on the analysis, whether the second notification is related to the first notification;
   in response to determining that the second notification is related to the first notification, providing, for display, a single notification comprising at least a portion of the content of the first notification and at least a portion of the content of the second notification, and providing for display a first indicator and a second indicator, wherein the first indicator indicates a single new notification for the first notification, the second notification, and any subsequent notifications related to the first notification when at least one of the first notification, the second notification, and any subsequent notifications is not yet accessed by a user, and wherein the second indicator indicates a number of notifications other than the first notification for which at a least a portion of content for the respective notification has been included in the single notification; and
   removing at least the first notification from display when the first notification is provided for display and the second notification is related to the first notification.

2. The computer-implemented method of claim 1, wherein each of the first notification and the second notification is an electronic message comprising a message body in at least one of a plain text or a HyperText Markup Language format.

3. The computer-implemented method of claim 1, wherein analyzing the content of the first notification and the content of the second notification comprises identifying an item, event, or service associated with the first notification and an item, event, or service associated with the second notification.

4. The computer-implemented method of claim 3, wherein determining whether the second notification is related to the first notification comprises determining whether the second notification is for the same item, event, or service as the first notification.

5. The computer-implemented method of claim 1, wherein providing the single notification comprises generating the single notification based on the first notification and the second notification.

6. The computer-implemented method of claim 1, wherein providing the single notification comprises providing the second notification for display when the second notification is related to the first notification.

7. The computer-implemented method of claim 6, wherein the first notification is provided for display in response to a request from a user.

8. The computer-implemented method of claim 1, wherein each of the first notification and the second notification is configured to indicate at least one of a calendar event, purchasing event, approval event, or social networking event.

9. The computer-implemented method of claim 1, wherein the single notification is configured in a format specific to the issuing source of the first notification and the second notification.

10. The computer-implemented method of claim 1, further comprising:
    receiving a third notification;
    analyzing content of the third notification;
    determining, based on the analysis, whether the third notification is related to the first notification; and
    providing, for display, an updated single notification comprising at least a portion of the content of the first notification, at least a portion of the content of the second notification, and at least a portion of the content of the third notification when the third notification is related to the first notification.

11. A system for providing a single notification for display in an application from multiple received notifications, the system comprising:
- a memory comprising a first notification for an application and a second notification for the application received subsequent to the first notification;
- a processor configured to:
  - analyze content of the first notification and content of the second notification;
  - determine, based on the analysis, whether the second notification is related to the first notification;
  - in response to determining that the second notification is related to the first notification, provide, for display, a single notification comprising at least a portion of the content of the first notification and at least a portion of the content of the second notification, and provide for display a first indicator and a second indicator, wherein the first indicator indicates a single new notification for the first notification, the second notification, and any subsequent notifications related to the first notification when at least one of the first notification, the second notification, and any subsequent notifications is not yet accessed by a user, and wherein the second indicator indicates a number of notifications other than the first notification for which at a least a portion of content for the respective notification has been included in the single notification; and
  - remove at least the first notification from display when the first notification is provided for display and the second notification is related to the first notification.

12. The system of claim 11, wherein each of the first notification and the second notification is an electronic message comprising a message body in at least one of a plain text or a HyperText Markup Language format.

13. The system of claim 11, wherein the processor being configured to analyze the content of the first notification and the content of the second notification comprises processor being configured to identify an item, event, or service associated with the first notification and an item, event, or service associated with the second notification.

14. The system of claim 13, wherein processor being configured to determine whether the second notification is related to the first notification comprises processor being configured to determine whether the second notification is for the same item, event, or service as the first notification.

15. The system of claim 11, wherein processor being configured to provide the single notification comprises processor being configured to generate the single notification based on the first notification and the second notification.

16. The system of claim 11, wherein processor being configured to provide the single notification comprises processor being configured to provide the second notification for display when the second notification is related to the first notification.

17. The system of claim 16, wherein the first notification is provided for display in response to a request from a user.

18. The system of claim 11, wherein each of the first notification and the second notification is configured to indicate at least one of a calendar event, purchasing event, approval event, or social networking event.

19. The system of claim 11, wherein the single notification is configured in a format specific to the issuing source of the first notification and the second notification.

20. A non-transitory machine-readable storage medium comprising machine-readable instructions for causing a processor to execute a method for providing a single notification for display in an application from multiple received notifications, the method comprising:
- receiving a first electronic message notification for an application and a second electronic message notification for the application subsequent to the first electronic message notification;
- identifying an item, event, or service associated with content of the first electronic message notification and an item, event, or service associated with content of the second electronic message notification;
- determining, based on the identifications, whether the second electronic message notification is for the same item, event, or service as the first electronic message notification;
- in response to determining that the second electronic message notification is related to the first notification, providing, for display, a single notification comprising at least a portion of the content of the first electronic message notification and at least a portion of the content of the second electronic message notification, and providing for display a first indicator and a second indicator, wherein the first indicator indicates a single new notification for the first electronic message notification, the second electronic message notification, and any subsequent electronic message notifications related to the first electronic message notification when at least one of the first electronic message notification, the second electronic message notification, and any subsequent electronic message notifications is not yet accessed by a user, and wherein the second indicator indicates a number of electronic message notifications other than the first electronic message notification for which at a least a portion of content for the respective electronic message notification has been included in the single notification; and
- removing at least the first electronic message notification from display when the first notification is provided for display and the second electronic message notification is related to the first electronic message notification.

* * * * *